(12) United States Patent
Ribeiro

(10) Patent No.: US 11,324,359 B2
(45) Date of Patent: May 10, 2022

(54) ARRANGEMENT FOR A MACHINE FOR BREAKING EGGS AND SEPARATING THE EGG YOLK AND THE EGG WHITE

(71) Applicant: Gilmar Ribeiro, Ribeirão Preto (BR)

(72) Inventor: Gilmar Ribeiro, Ribeirão Preto (BR)

(*) Notice: Subject to any disclaimer, the term of this patent is extended or adjusted under 35 U.S.C. 154(b) by 61 days.

(21) Appl. No.: 16/651,033

(22) PCT Filed: Sep. 26, 2018

(86) PCT No.: PCT/BR2018/050352
§ 371 (c)(1),
(2) Date: Mar. 26, 2020

(87) PCT Pub. No.: WO2019/060973
PCT Pub. Date: Apr. 4, 2019

(65) Prior Publication Data
US 2020/0245817 A1    Aug. 6, 2020

(30) Foreign Application Priority Data
Sep. 26, 2017 (BR) .................. 20 2017 020633 0

(51) Int. Cl.
*A47J 43/14* (2006.01)
(52) U.S. Cl.
CPC ................... *A47J 43/145* (2013.01)
(58) Field of Classification Search
CPC ................. A47J 43/145; A47J 43/14
USPC .................................. 99/498, 500
See application file for complete search history.

(56) References Cited

U.S. PATENT DOCUMENTS

| | | | | |
|---|---|---|---|---|
| 3,029,849 A * | 4/1962 | Willsey | ................. | A47J 43/145 99/500 |
| 3,133,569 A * | 5/1964 | Shelton | ................. | A47J 43/145 99/498 |
| 3,142,322 A * | 7/1964 | Shelton | ................. | A47J 43/145 99/498 |
| 3,147,783 A * | 9/1964 | Noltes | ................... | A47J 43/145 99/498 |
| 3,203,458 A * | 8/1965 | Shelton | ................. | A47J 43/145 426/299 |
| 3,324,911 A * | 6/1967 | Sakai | .................... | A47J 43/145 99/498 |
| 3,420,743 A * | 1/1969 | Sandhage | ............ | A47J 43/145 435/237 |
| 3,480,056 A * | 11/1969 | Willsey | ................. | A47J 43/145 99/498 |

(Continued)

*Primary Examiner* — Sean M Michalski
(74) *Attorney, Agent, or Firm* — Maier & Maier, PLLC

(57) ABSTRACT

A machine which includes a structure and, wherein the structure has a conveyor belt, and the structure has a rotary carousel, including a plurality of cutting devices, as well as a convex tray, which conducts the egg yolk and the egg white to a compartment and a tapered compartment; the machine also includes, to dispose of the egg shells, a compartment for housing the egg shells; where the egg yolk and egg white are separated by a compartment which conducts the egg yolk and egg white to a second tapered compartment, such that in the last tapered compartment, which is provided with an open slit, the egg white drains through the slit, while the egg yolk follows the regular flow to another container, the egg shells in turn being directed to a convex tray until proceeding to another container.

1 Claim, 18 Drawing Sheets

(56) References Cited

U.S. PATENT DOCUMENTS

| | | | | |
|---|---|---|---|---|
| 4,134,333 | A * | 1/1979 | Warren | A01K 43/00 99/498 |
| 4,137,838 | A * | 2/1979 | Warren | A47J 43/145 99/500 |
| 4,773,322 | A * | 9/1988 | Willsey | A23J 1/09 99/497 |
| 4,799,423 | A * | 1/1989 | Willsey | A47J 43/145 99/497 |
| 5,085,139 | A * | 2/1992 | Pellegrinelli | A47J 43/145 99/497 |
| 5,293,815 | A * | 3/1994 | Tomosue | A47J 43/145 99/498 |
| 5,325,768 | A * | 7/1994 | van den Hazel | A47J 43/145 99/497 |
| 5,377,583 | A * | 1/1995 | Tomosue | A47J 43/145 99/497 |
| 5,460,083 | A * | 10/1995 | Hutchinson | A01K 43/005 134/131 |
| 5,483,872 | A * | 1/1996 | Nield | A47J 43/145 426/231 |
| 5,613,429 | A * | 3/1997 | Pettazzi | A47J 43/145 99/497 |
| 6,234,070 | B1 * | 5/2001 | Hutchison | A47J 43/145 30/120.1 |
| 8,387,775 | B2 * | 3/2013 | Mckeown | B65G 47/26 198/485.1 |
| 8,739,695 | B2 * | 6/2014 | Kristensen | A47J 43/145 99/500 |
| 8,955,429 | B2 * | 2/2015 | Kwapich | A23J 1/09 99/500 |
| 10,220,538 | B2 * | 3/2019 | Federowicz | A47J 43/145 |

\* cited by examiner

ARRANGEMENT FOR A MACHINE FOR BREAKING EGGS AND SEPARATING THE EGG YOLK AND THE EGG WHITE

FIELD

This patent application refers to an unprecedented ARRANGEMENT FOR A MACHINE FOR BREAKING EGGS AND SEPARATING THE EGG YOLK AND THE EGG WHITE, notably to a machine that aims to break eggs, as well as to separate the egg yolk from the egg white, in which the improvement in question is made by means of two structures composed of a conveyor belt and a rotary carousel, the conveyor belt being able to distribute a plurality of eggs to a plurality of breaking devices allocated in the rotary carousel, in which all the operation of the machine is made by means of a gearmotor that provides kinetic energy to a transmission mechanism that performs the transmission itself between the whole set.

The field of application of this innovation is aimed at breaking eggs, as well as separating the egg yolk and egg white, used in large-scale industrial production.

CONVINCING

As knowing by the professionals of food industry that use eggs to prepare pasta or even in the manufacture of powdered eggs, there is a great difficulty in breaking and separating their content, because the existing machines promote the breaking of the eggs on the upper side, which does not allow the separation of the egg white and the egg yolk.

BACKGROUND

The current prior art anticipates some patent documents dealing with the subject matter, such as document PI 0203765-3 A2, which is characterized by a main body formed from a platform that superiorly packs an electric motor that controls an axis, this equipped with an eccentric toothed belt connected to a conductive pulley by means of a chain moving a pulley driven from a conveyor belt which accommodates a plurality of fresh eggs from an auxiliary conveyor belt, and said conveyor belt acts in conjunction with a hollowed wheel that drives another wheel, it is attached to an arm that propels the weights vertically by compressing the eggs, the wheel simultaneously moving the levers that actuate the piston, propelling the knife box vertically where the knives break the egg shells, and said knives have a medium tension spring that allows them to be opened by compressing the ears fixed to the axis, this driven by the piston allowing the content of the eggs to flow through the channel promoted by the opening of the knives, the content of the eggs being conveyed to a conductive conveyor belt, it is provided with a first mug that retains the egg yolk, while the egg white runs through the hole on the bottom and the sides of the first mug into a second mug, the egg yolk and egg white being subsequently deposited in reservoirs.

The document above basically reveals a system that transports eggs by means of a conveyor belt pulled by an electric motor, with a set of pulleys and a gear wheel, plus chain; where the egg breaking system is made by means of an arm that propels weights vertically compressing the eggs, with a piston propelling a box of knives vertically, where the knives break the egg shells, which subsequently a traction spring allows the compression of the ears fixed on an axis driven by a piston, thus allowing the flow of the eggs through a channel; in which the eggs are led to a conductive conveyor belt to a first mug that retains the egg yolk, while the egg white flows into a second mug. However, it is noted that the machine comprises a breaking system different from the application here claimed, as well as showing, a breaking process, on a smaller scale, that is on a smaller quantity, since it contains only one line of breaking devices, the application being claimed herein predict a rotary carousel with a plurality of cutting devices. As well, it does not present a means for disposing of broken eggshells in its system.

SUMMARY

The objective of this innovation is to propose a machine composed of a wide conveyor belt pulled by a transmission mechanism;

The objective of this innovation is to propose the breaking of several eggs simultaneously;

The objective of this innovation is to propose a greater amount of egg yolk and egg white separated in relation to the current prior art;

The objective of this innovation is to propose a transmission mechanism from a single gearmotor.

Aware of the gaps and their limitations, the inventor in question created the ARRANGEMENT FOR A MACHINE FOR BREAKING EGGS AND SEPARATING THE EGG YOLK AND THE EGG WHITE, which basically consists of a machine that aims to break eggs by means of a system consisting of a conveyor belt and a rotary carousel equipped with a plurality of breaking devices, in which such devices complete a 360° turn on the rotary carousel, whereas the whole system of the machine has its movement done through a gearmotor that provides kinetic energy for a transmission mechanism, thus enabling the machine to carry out the breaking of eggs which are allocated on a conveyor belt, until they are distributed and allocated in the cutting devices, which are activated and retracted by means of arched supports, which are fixed on an axis provided in the rotary carousel, which in addition includes convex supports also responsible for triggering and retracting the breaking devices. More precisely, the eggs have their shells broken by a set of knives of the cutting device; consequently the egg yolk and the egg white fall in a convex tray, until the egg yolk and the egg white reach a compartment which is connected to a second smaller compartment with a lateral hollow slot; while the egg yolk follows its normal course until the end of the smaller compartment being directed to any container, the egg white runs down the side slit, going to another container, thus separating the egg yolk and the egg white. The cycle described above is repeated continuously, making the break; the disposal of egg shells, as well as the separation of the egg yolk to the egg white.

BRIEF DESCRIPTION OF THE DRAWING

For better understanding, the drawings are attached.

DETAILED DESCRIPTION

Figure 1:
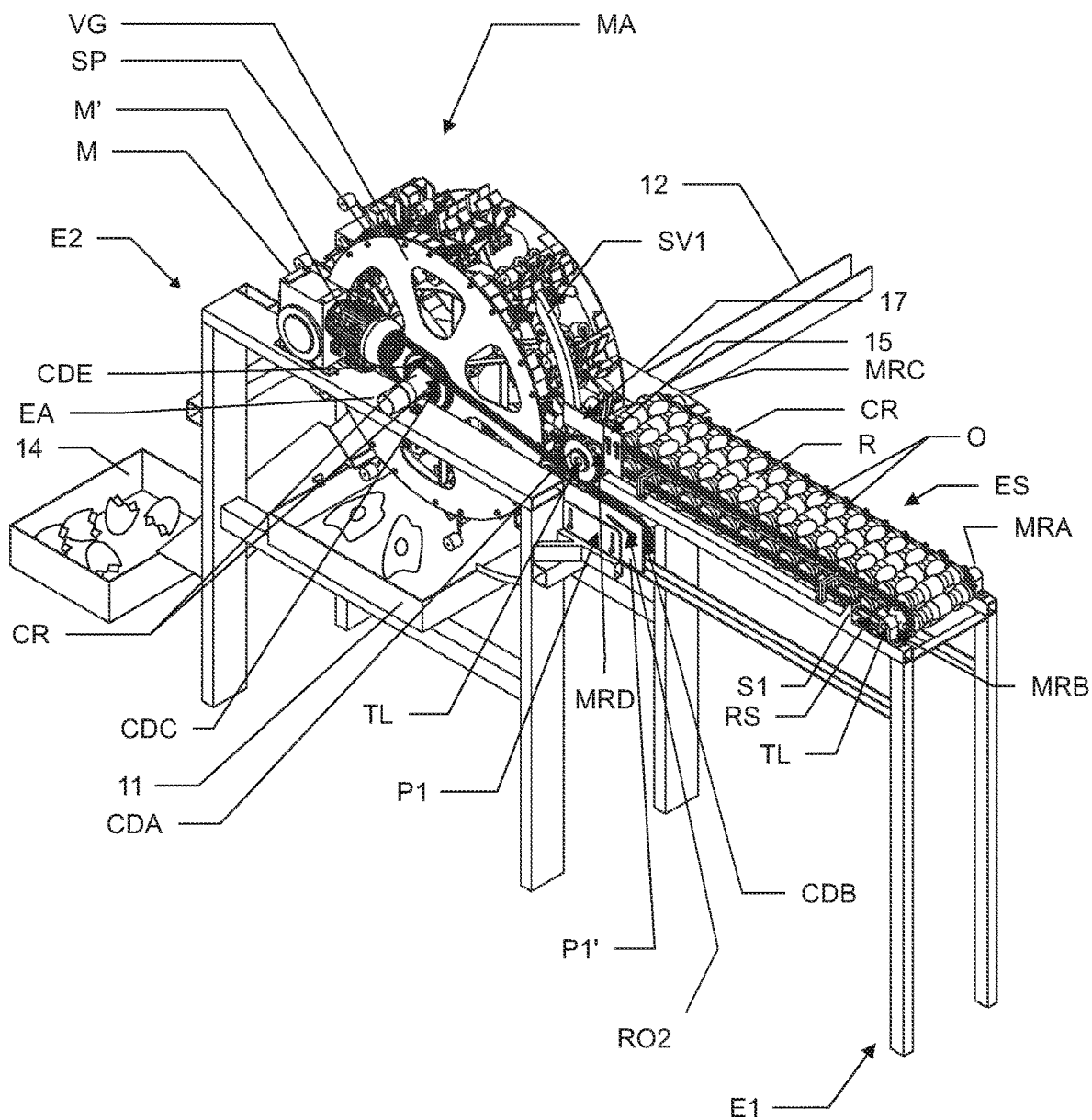
FIG. 1: Perspective view of the arrangement for a machine for breaking eggs and separating the egg yolk and the egg white.
Figure 2:
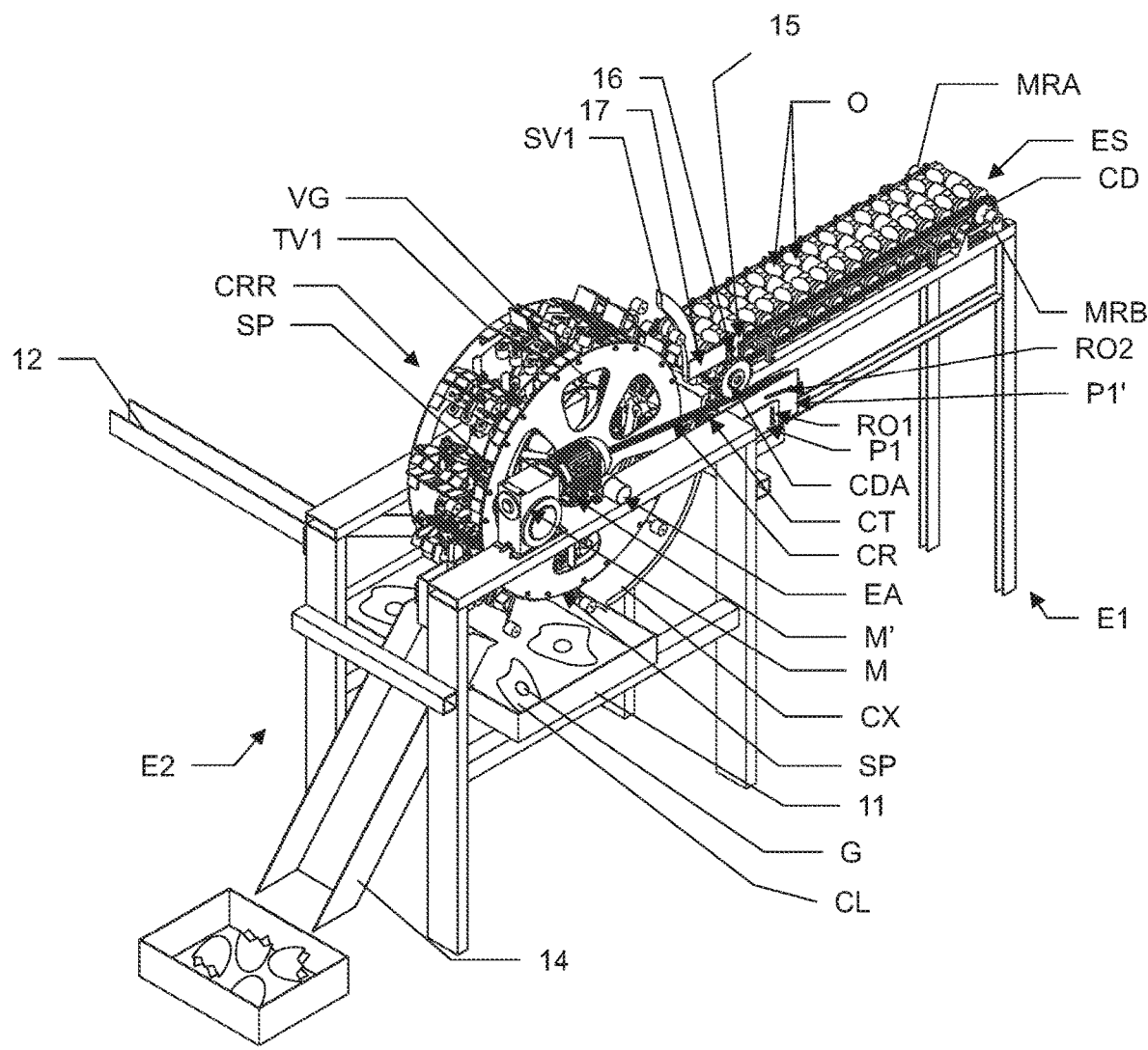
FIG. 2: Inverted perspective view of the arrangement for a machine for breaking eggs and separating the egg yolk and the egg white.
Figure 3:
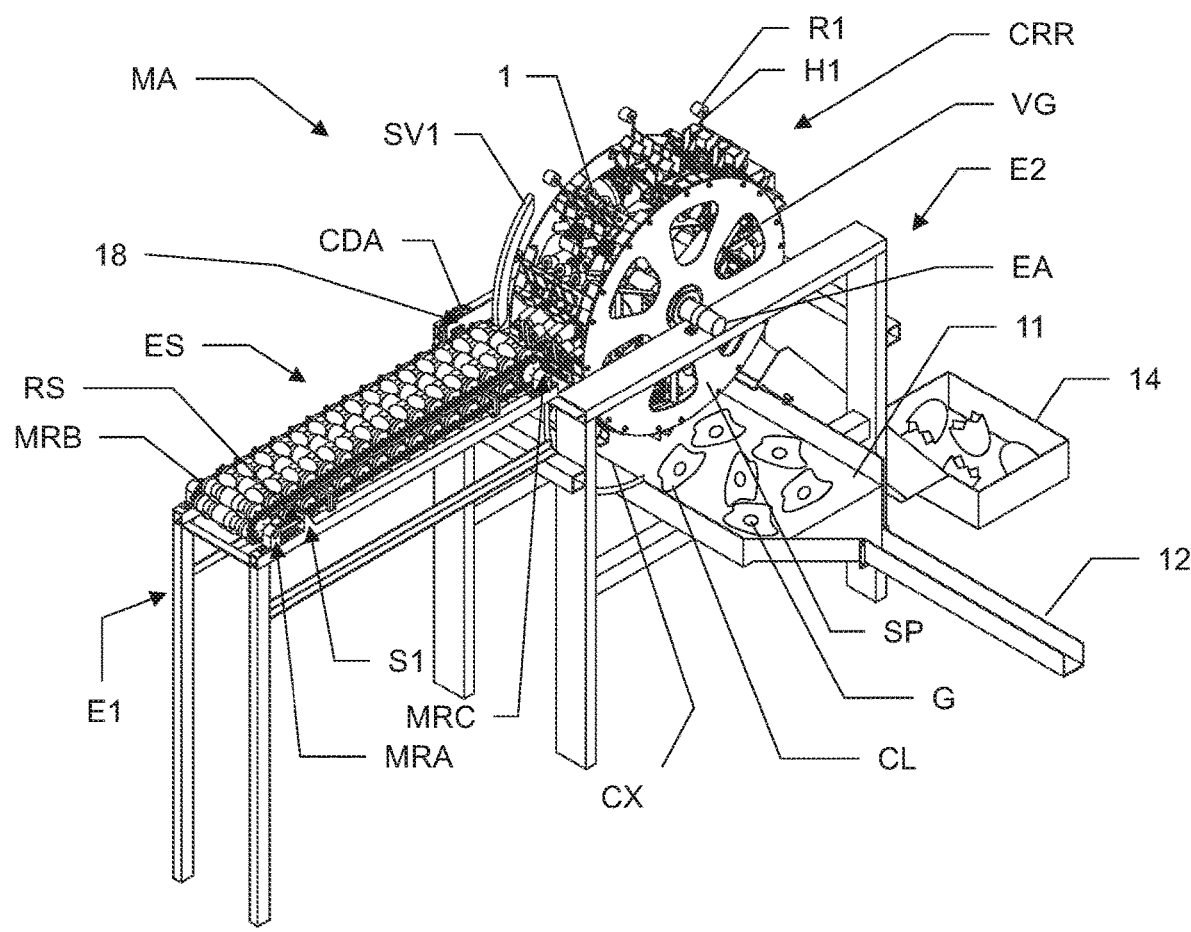
FIG. 3: Inverted perspective view of the arrangement for a machine for breaking eggs and separating the egg yolk and the egg white.
Figure 4:
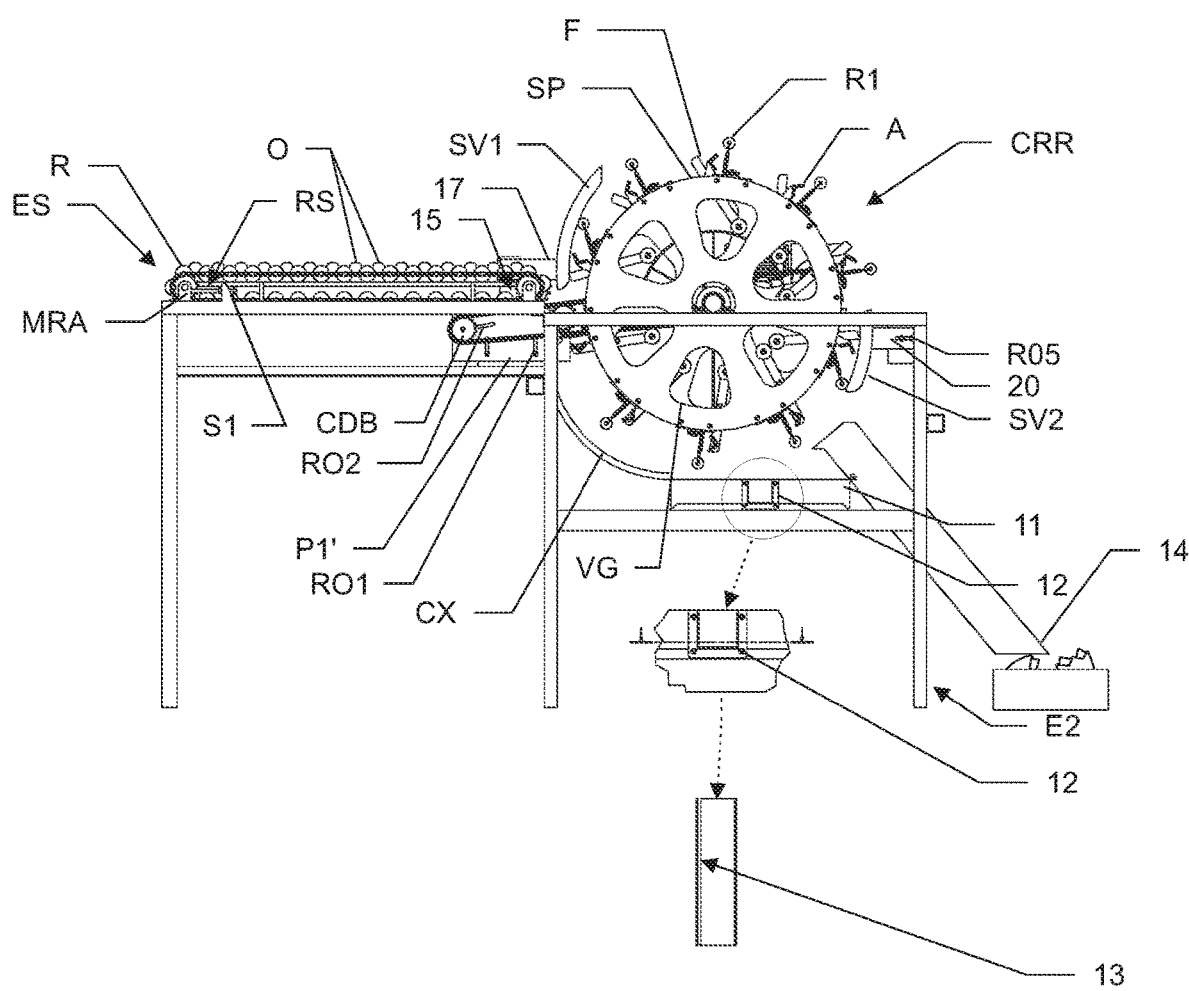
FIG. 4: Side view of the arrangement for a machine for breaking eggs and separating the egg yolk and the egg white.
Figure 5:
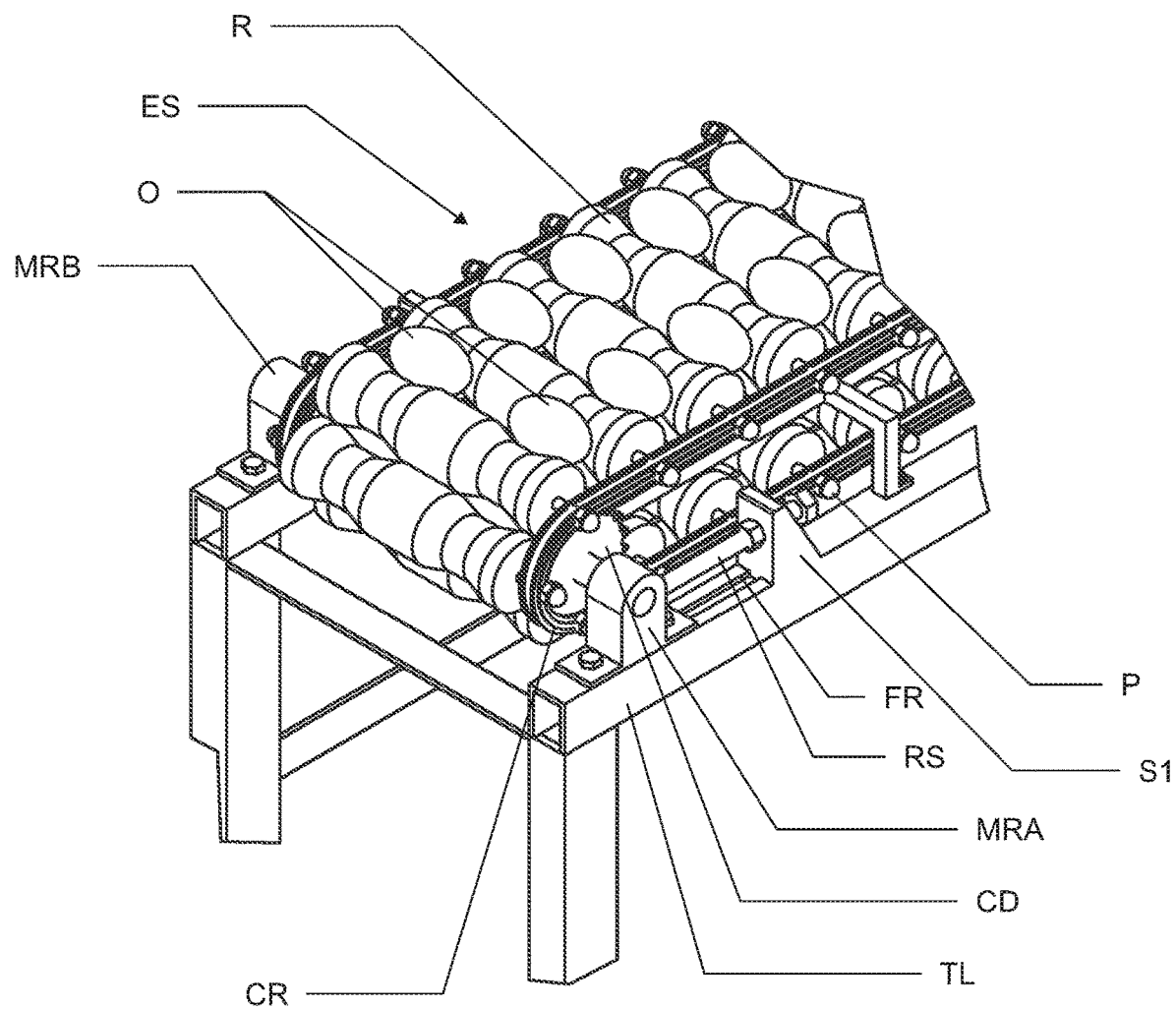
FIG. 5: Perspective view of the arrangement for a machine for breaking eggs and separating the egg yolk and the egg white, showing an expanded detail of the conveyor belt.
Figure 6:
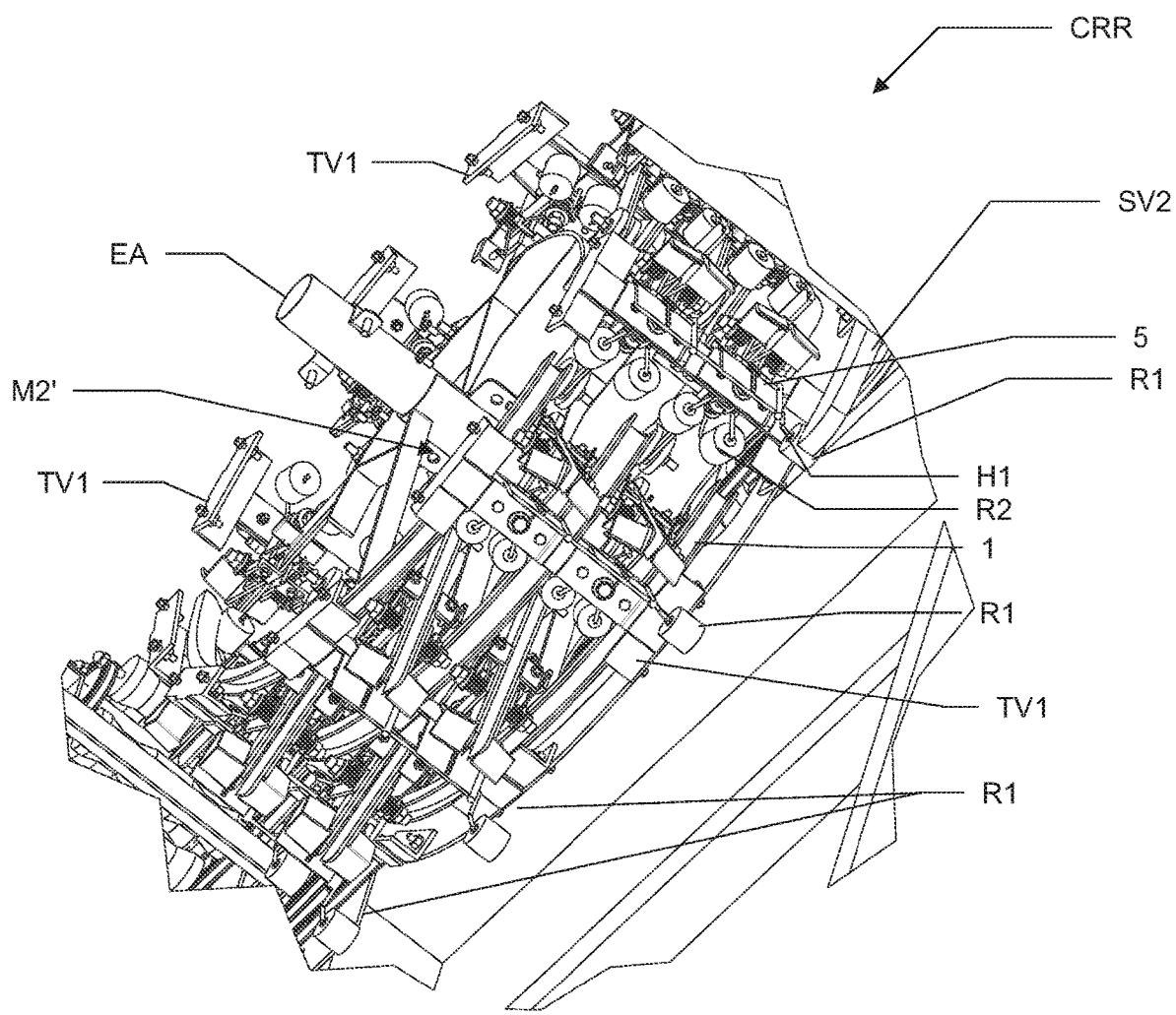
FIG. 6: Perspective view of the arrangement for a machine for breaking eggs and separating the egg yolk and the egg white, showing an expanded detail of the rotary carousel.
Figure 7:
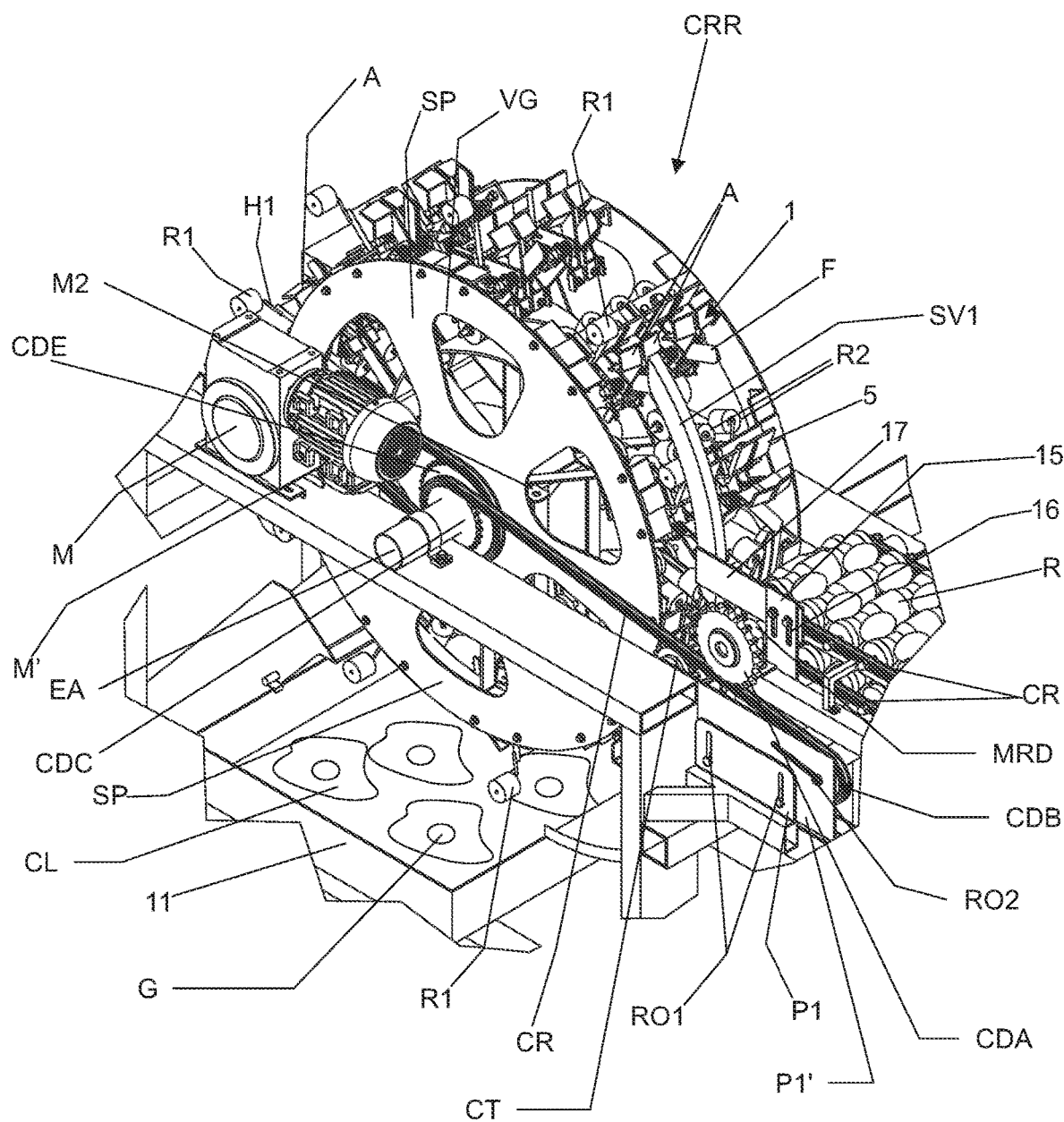
FIG. 7: Perspective view of the arrangement for a machine for breaking eggs and separating the egg yolk and the egg white, showing an expanded detail of the rotary carousel and gearbox.
Figure 8:
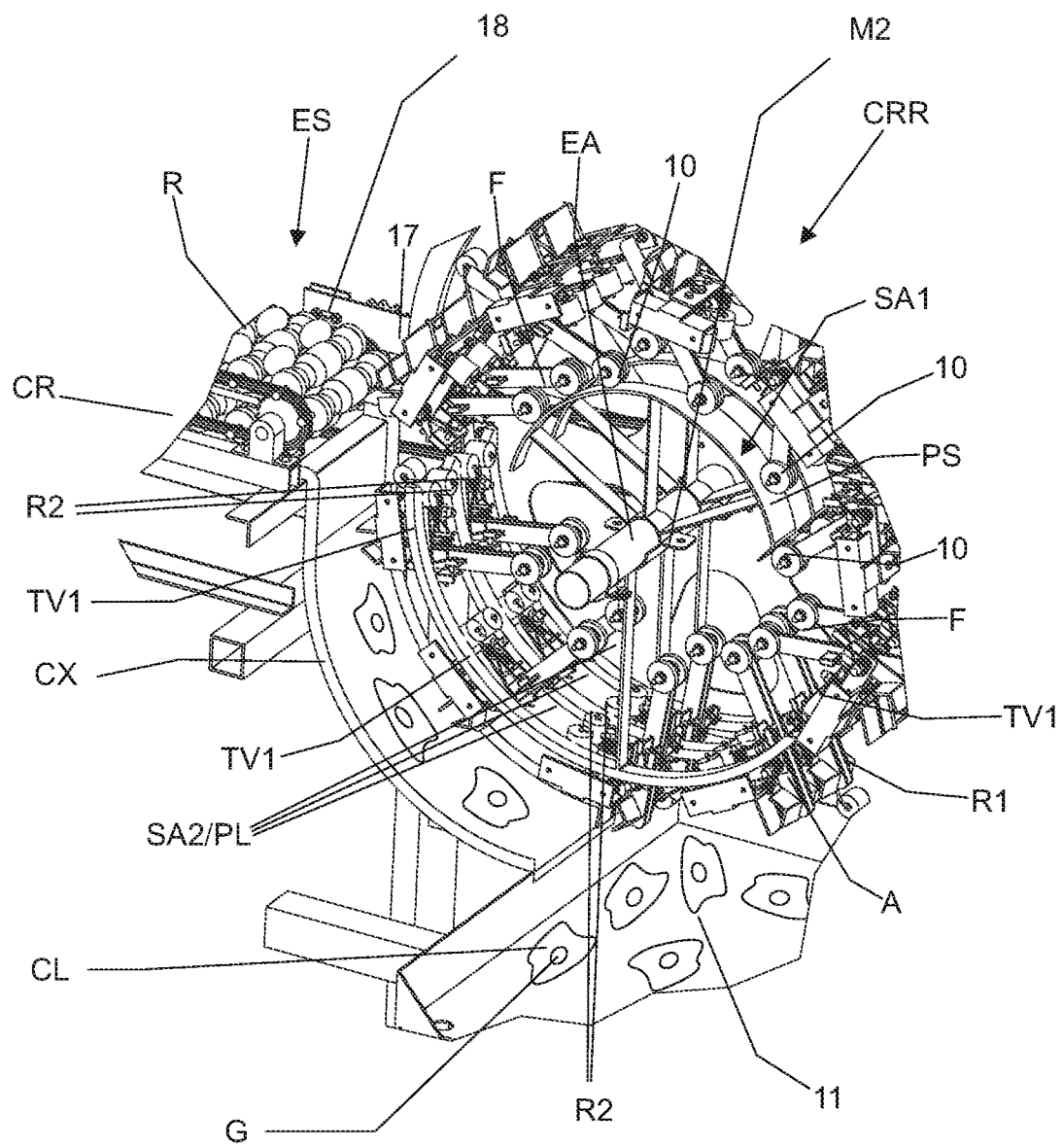
FIG. 8: Perspective view of the arrangement for a machine for breaking eggs and separating the egg yolk and the egg white, showing an expanded detail of a partial section of the rotary carousel.
Figure 9:
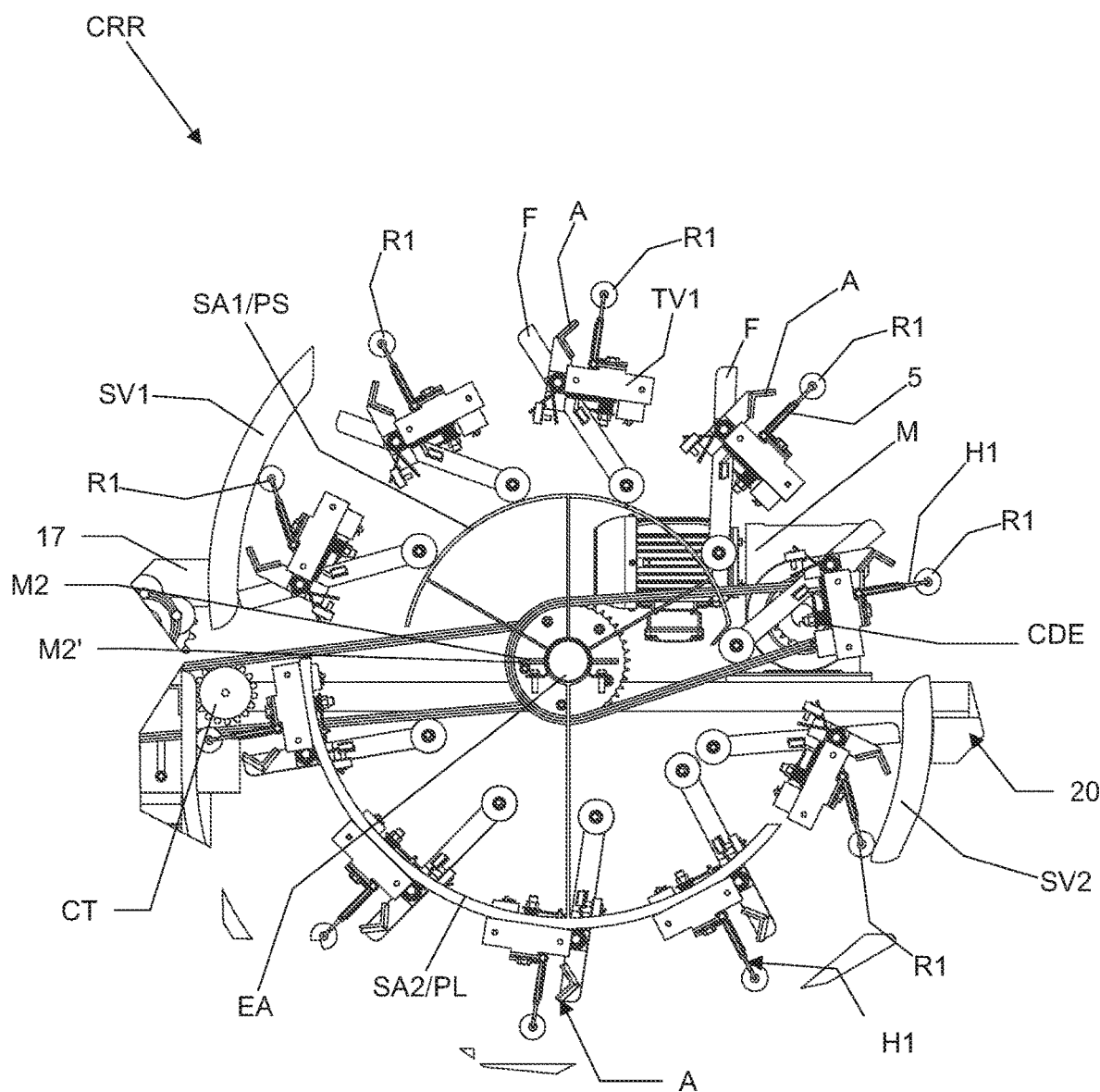
FIG. 9: Side view of the arrangement for a machine for breaking eggs and separating the egg yolk and the egg white, showing a schematic detail of the rotary carousel.
Figure 10:
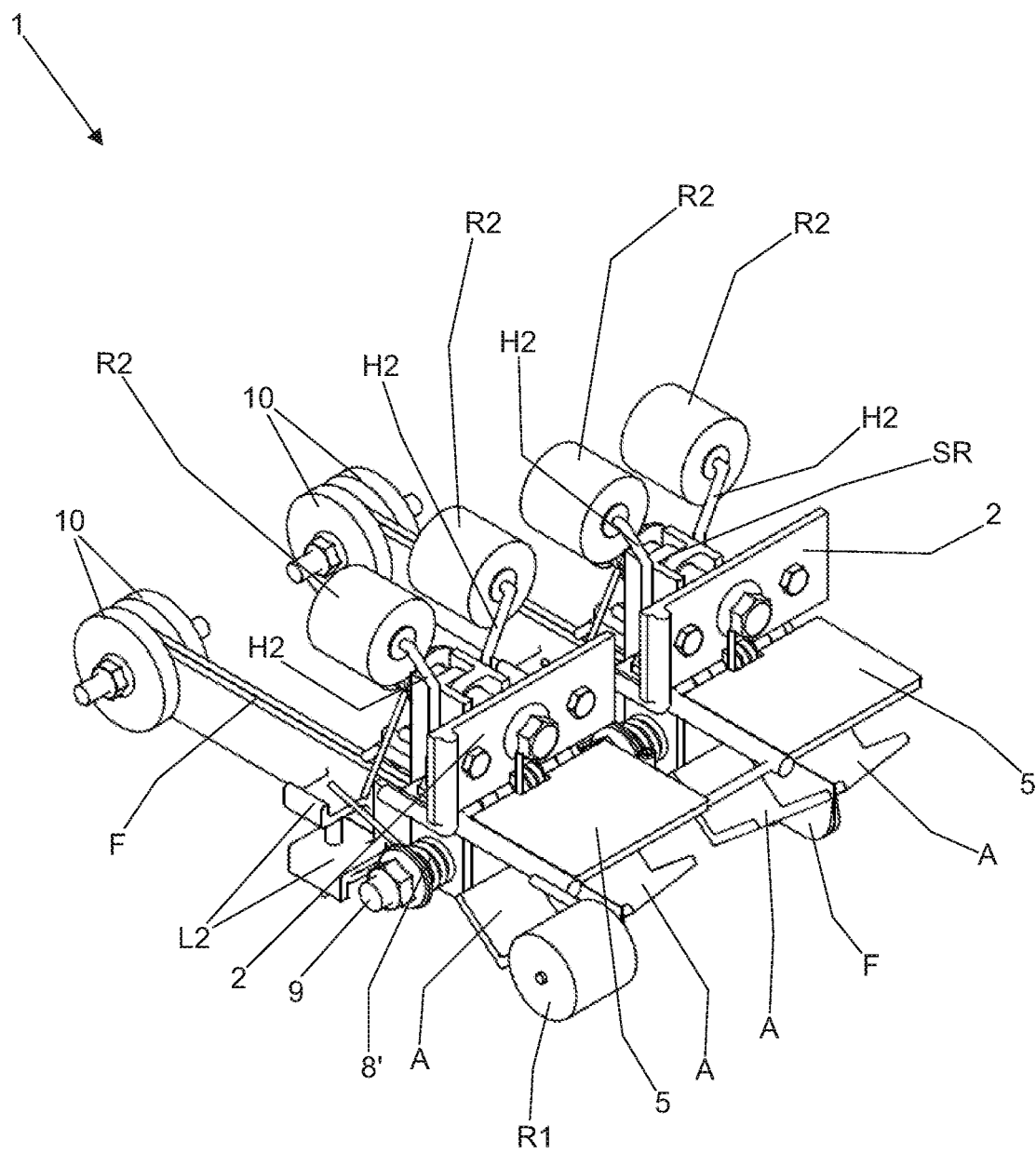
FIG. 10: Perspective view of the arrangement for a machine for breaking eggs and separating the egg yolk and the egg white, showing an expanded detail of the cutting device linked to a second cutting device without side bearing.
Figure 11:
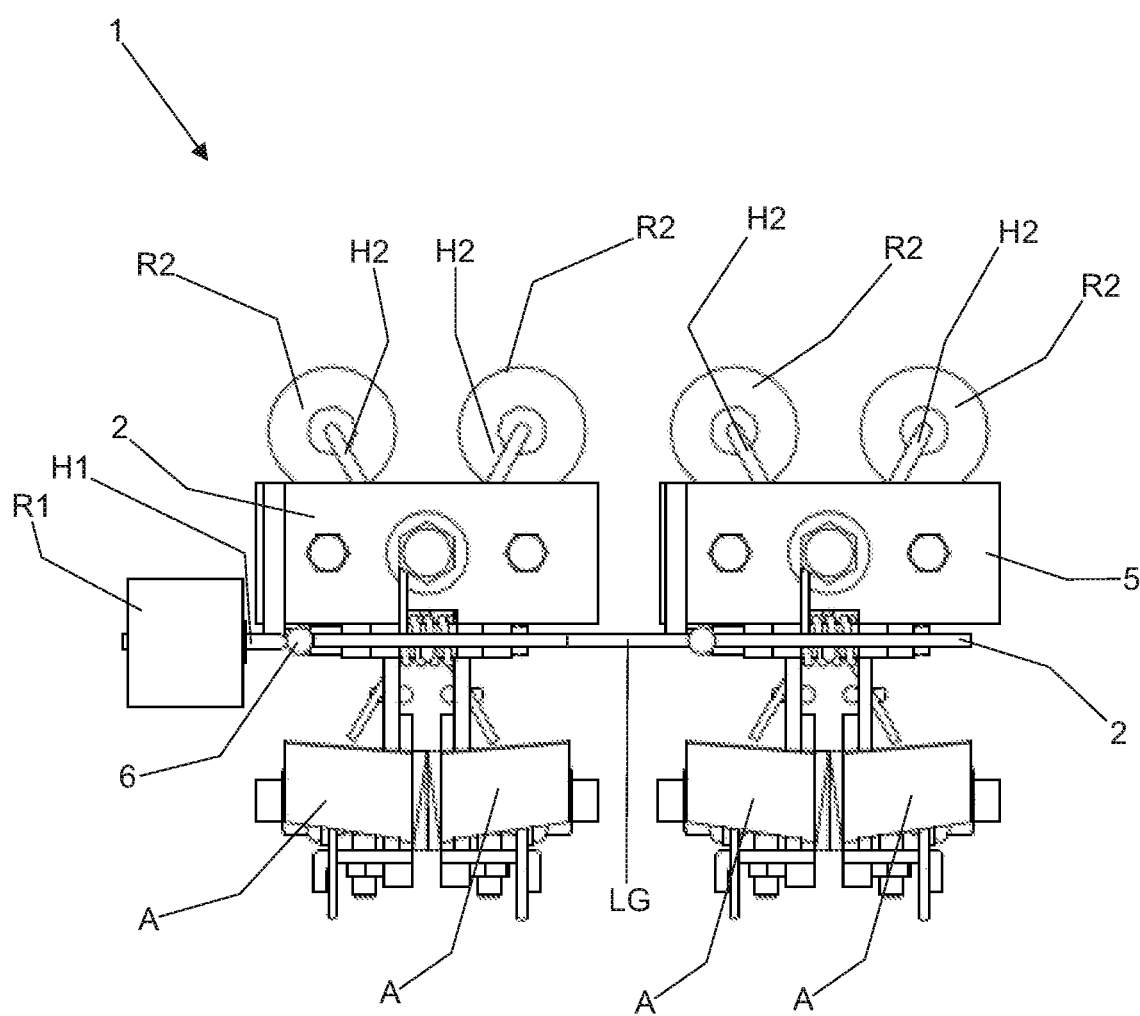
FIG. 11: Front view of the arrangement for a machine for breaking eggs and separating the egg yolk and the egg white, showing an expanded detail of the cutting device linked to a second cutting device without side bearing.
Figure 12:
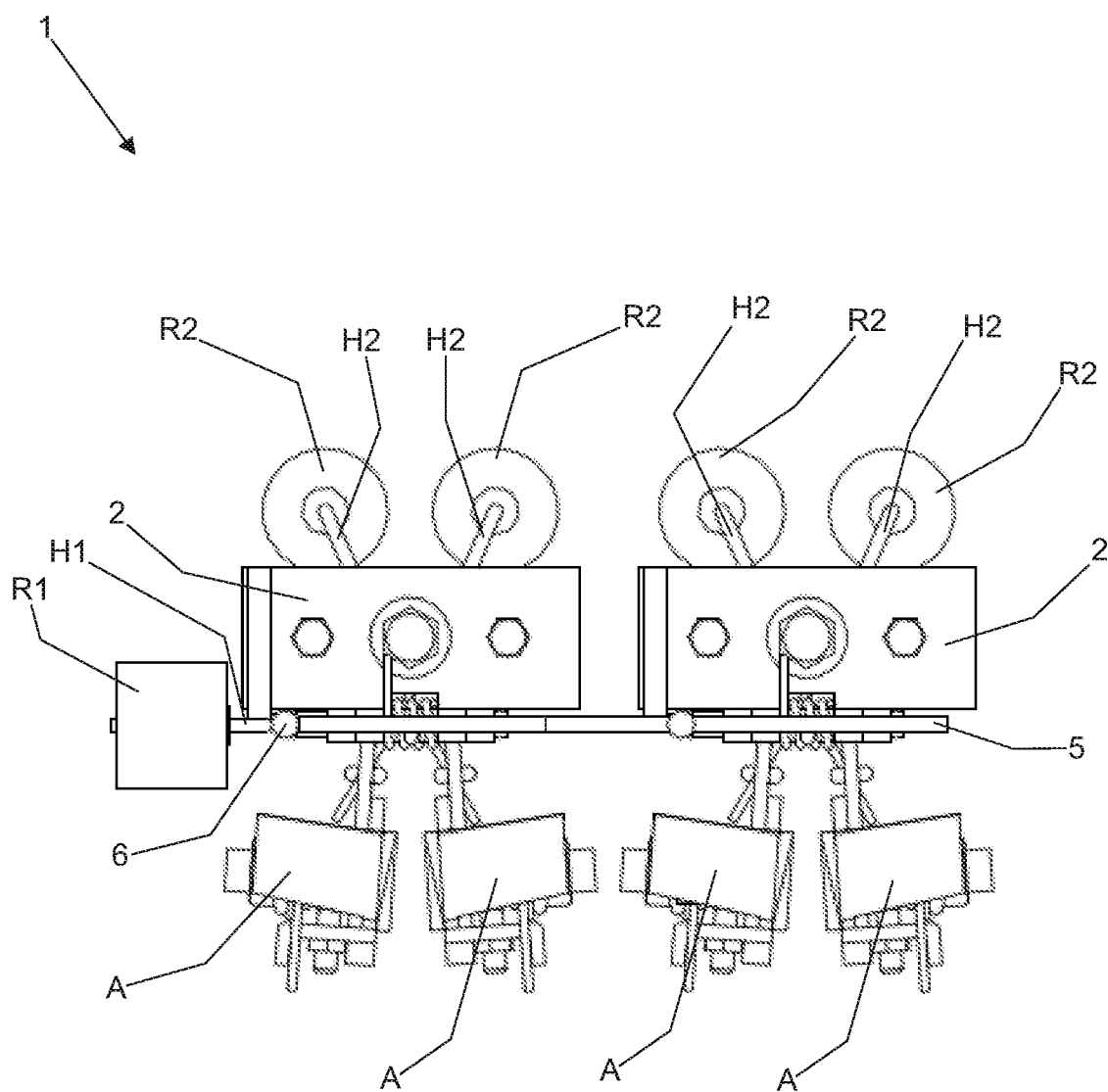
FIG. 12: Front view of the arrangement for a machine for breaking eggs and separating the egg yolk and the egg white, showing an expanded detail of the cutting device with open knives.
Figure 13:
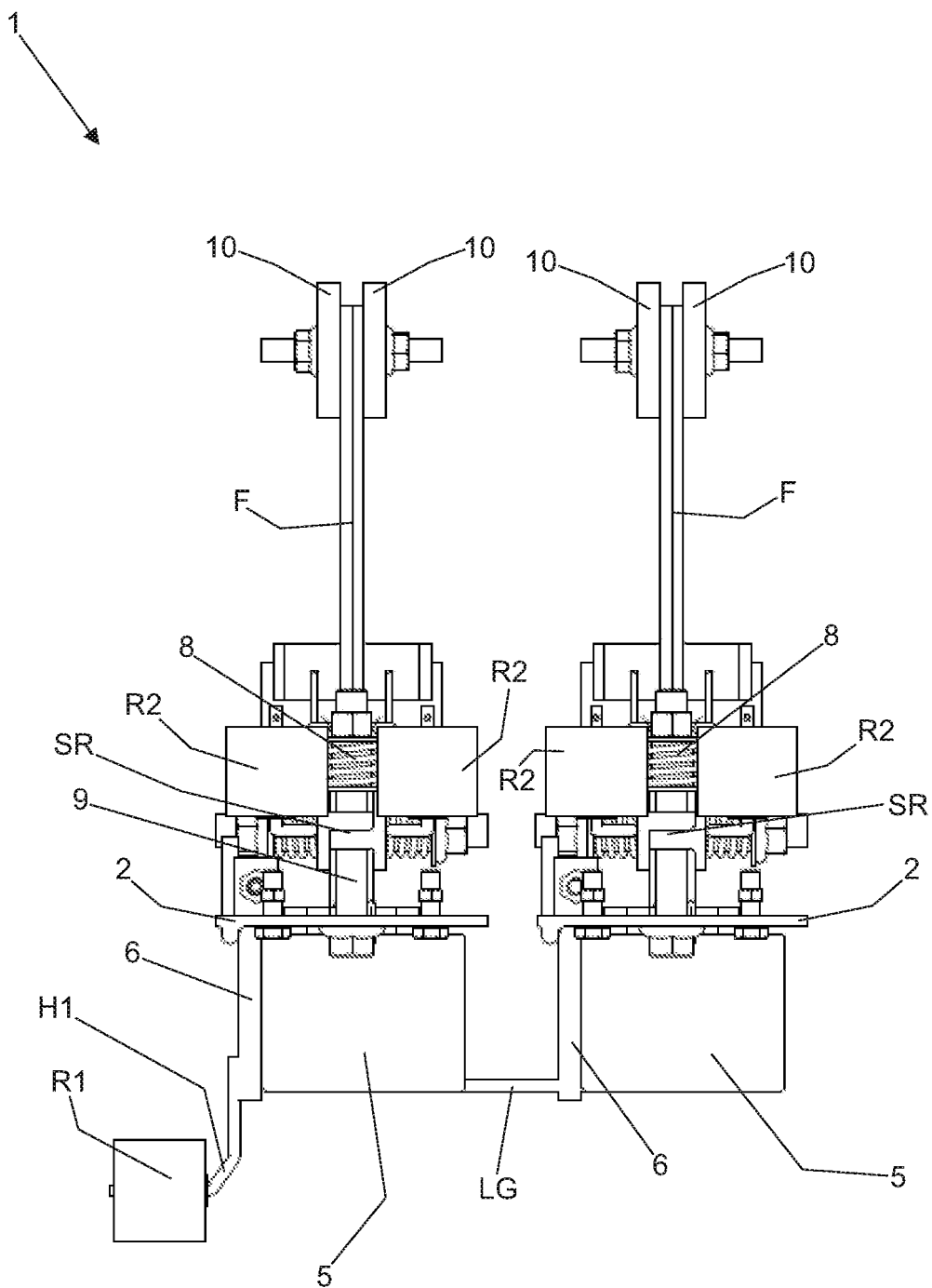
FIG. 13: Top view of the arrangement for a machine for breaking eggs and separating the egg yolk and the egg white, showing an expanded detail of the cutting device linked to a second cutting device without side bearing.
Figure 14:
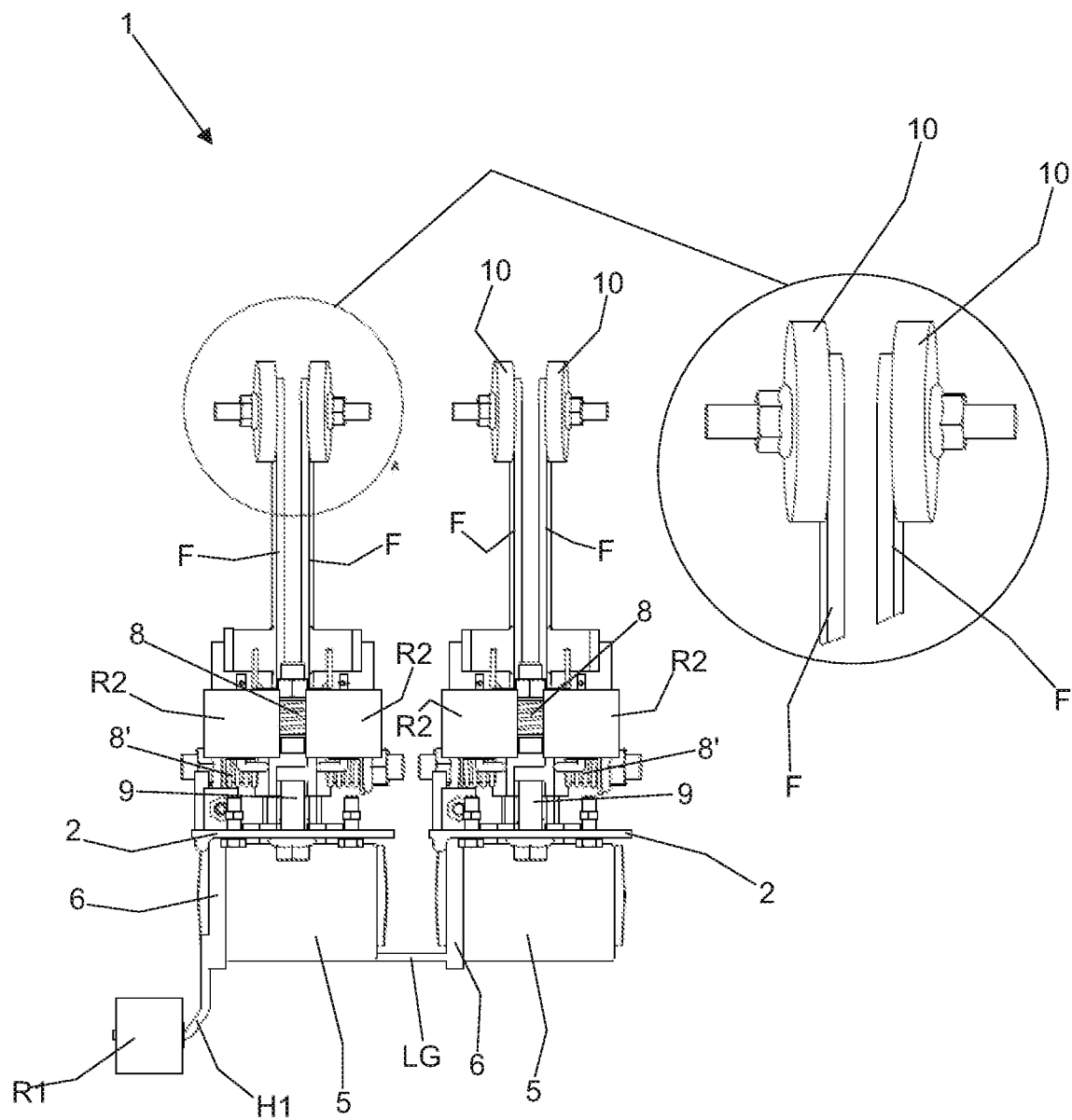
FIG. 14: Top view of the arrangement for a machine for breaking eggs and separating the egg yolk and the egg white, showing an expanded detail of the cutting device with open knives.
Figure 15:
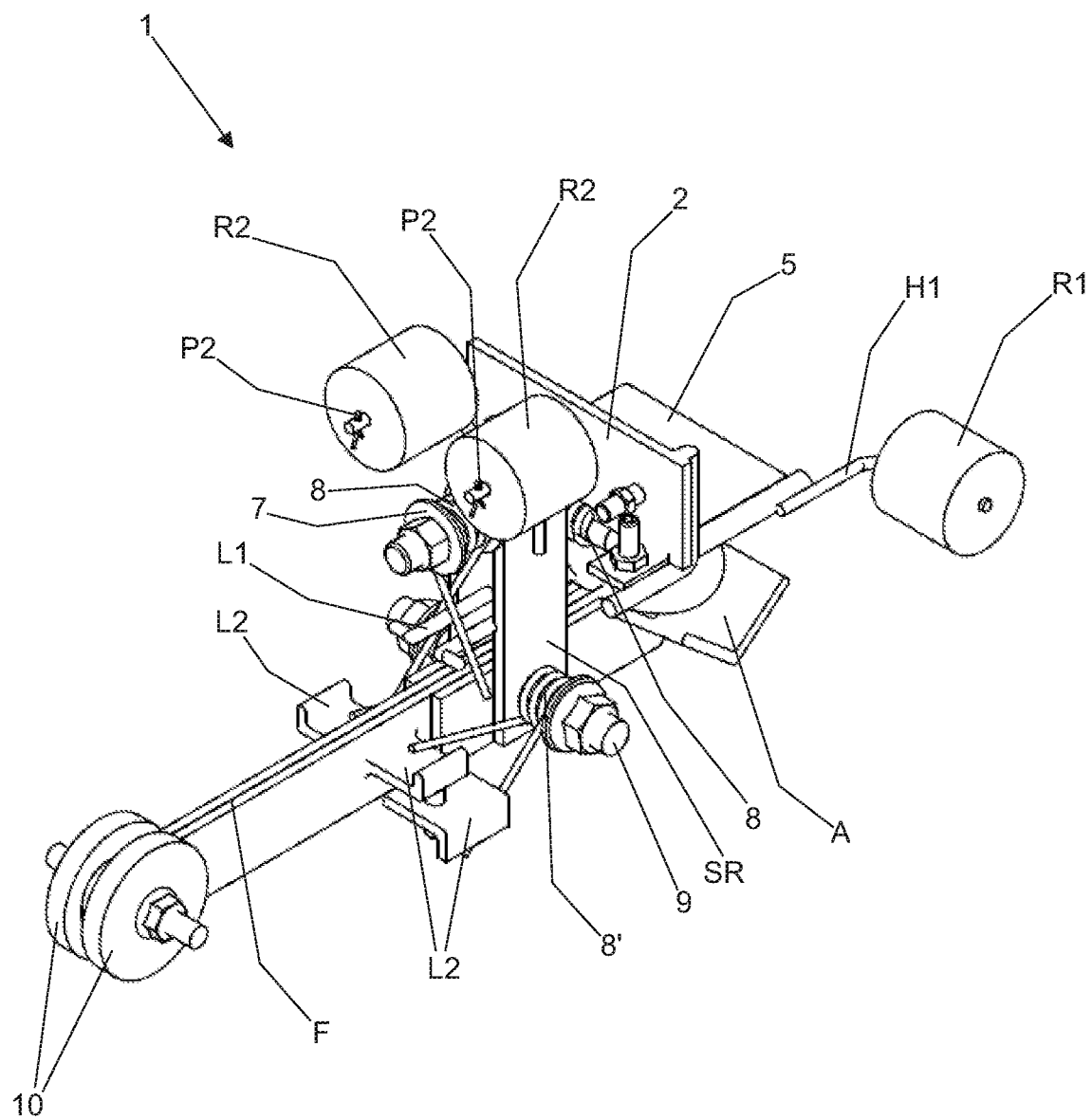
FIG. 15: Perspective view of the arrangement for a machine for breaking eggs and separating the egg yolk and the egg white, showing an expanded detail of the cutting device composed of a side bearing.
Figure 16:
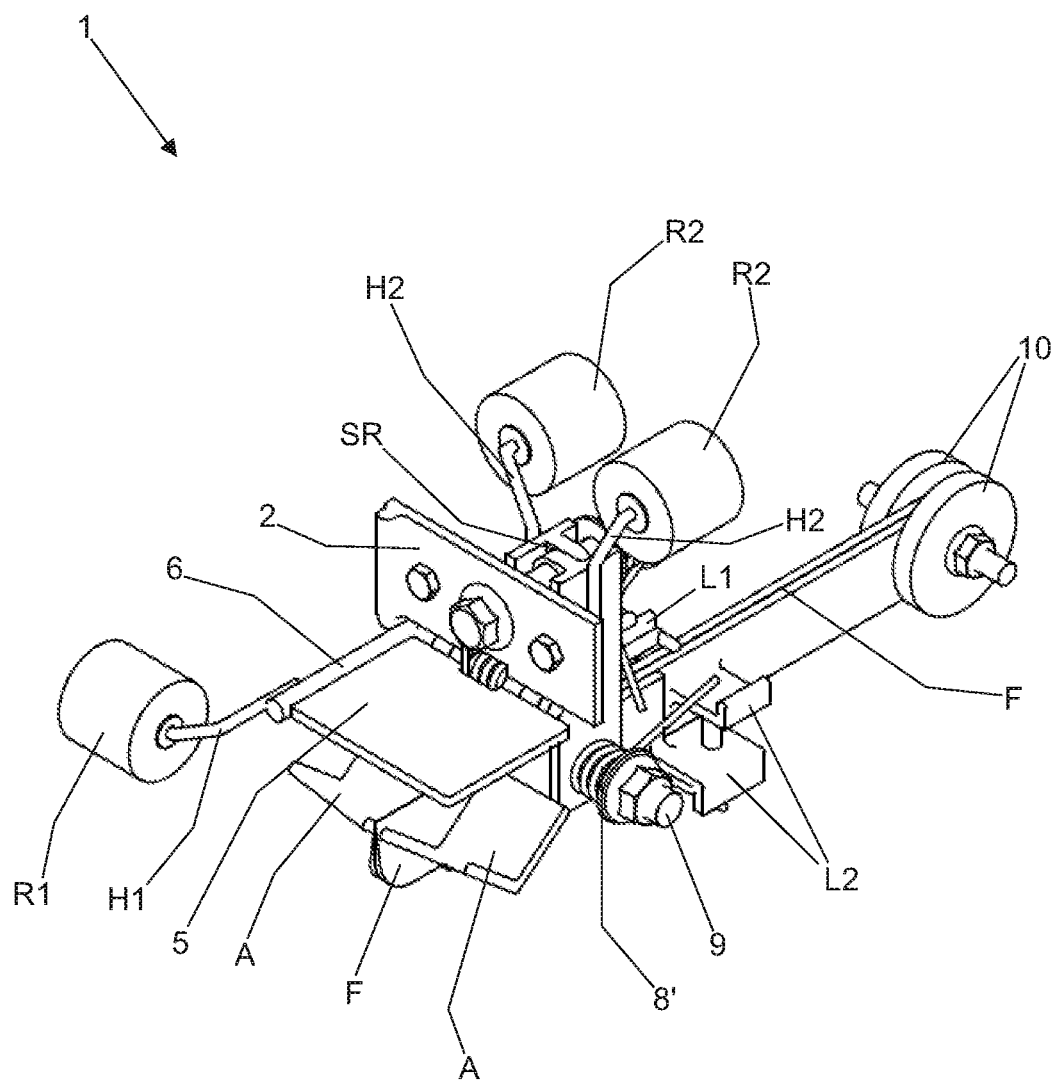
FIG. 16: Inverted perspective view of the arrangement for a machine for breaking eggs and separating the egg yolk and the egg white, showing an expanded detail of the cutting device composed of a side bearing.
Figure 17:
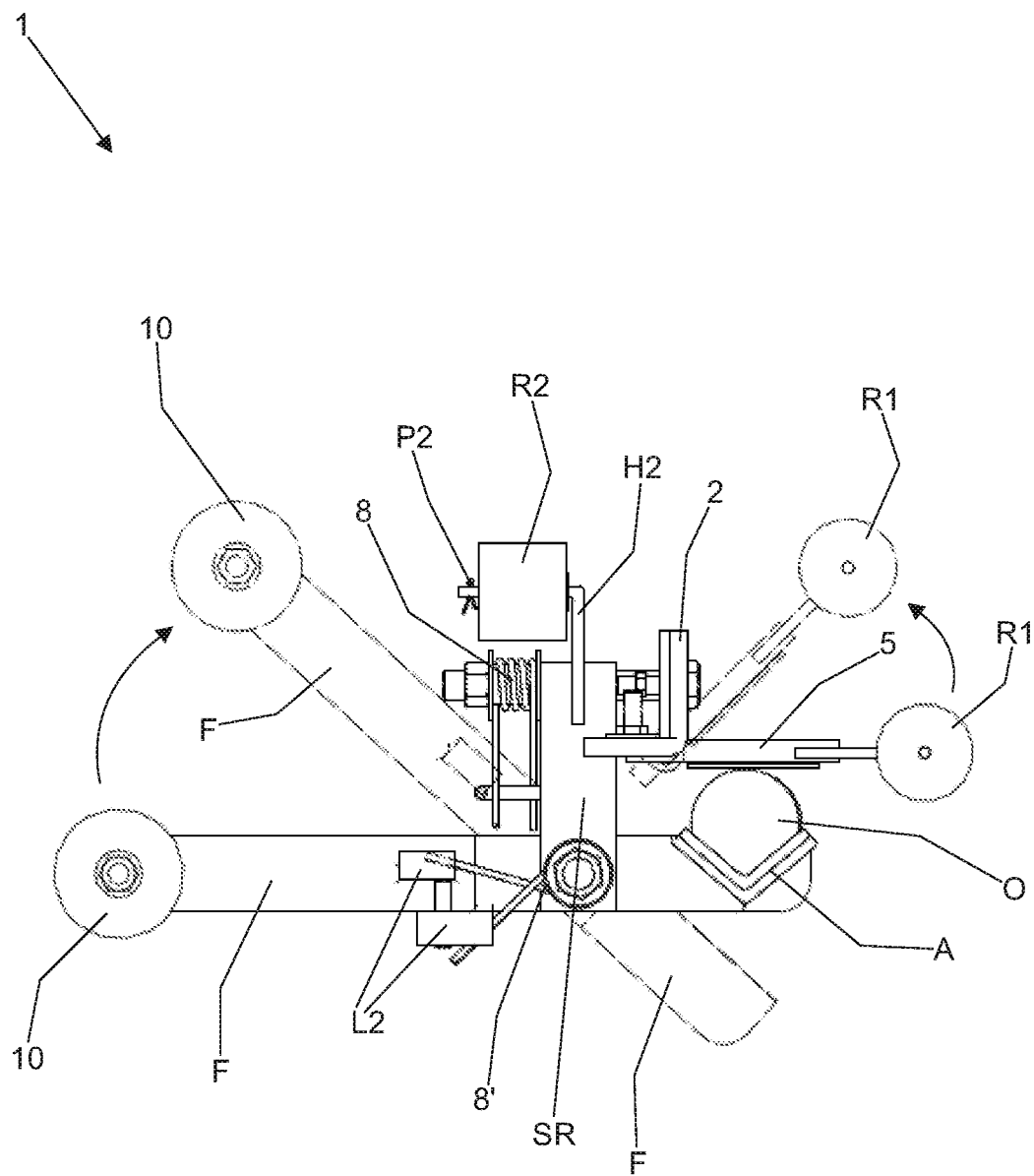
FIG. 17: Lateral view of the arrangement for a machine for breaking eggs and separating the egg yolk and the egg white, showing an expanded detail of the cutting device composed of a side bearing.
Figure 18:
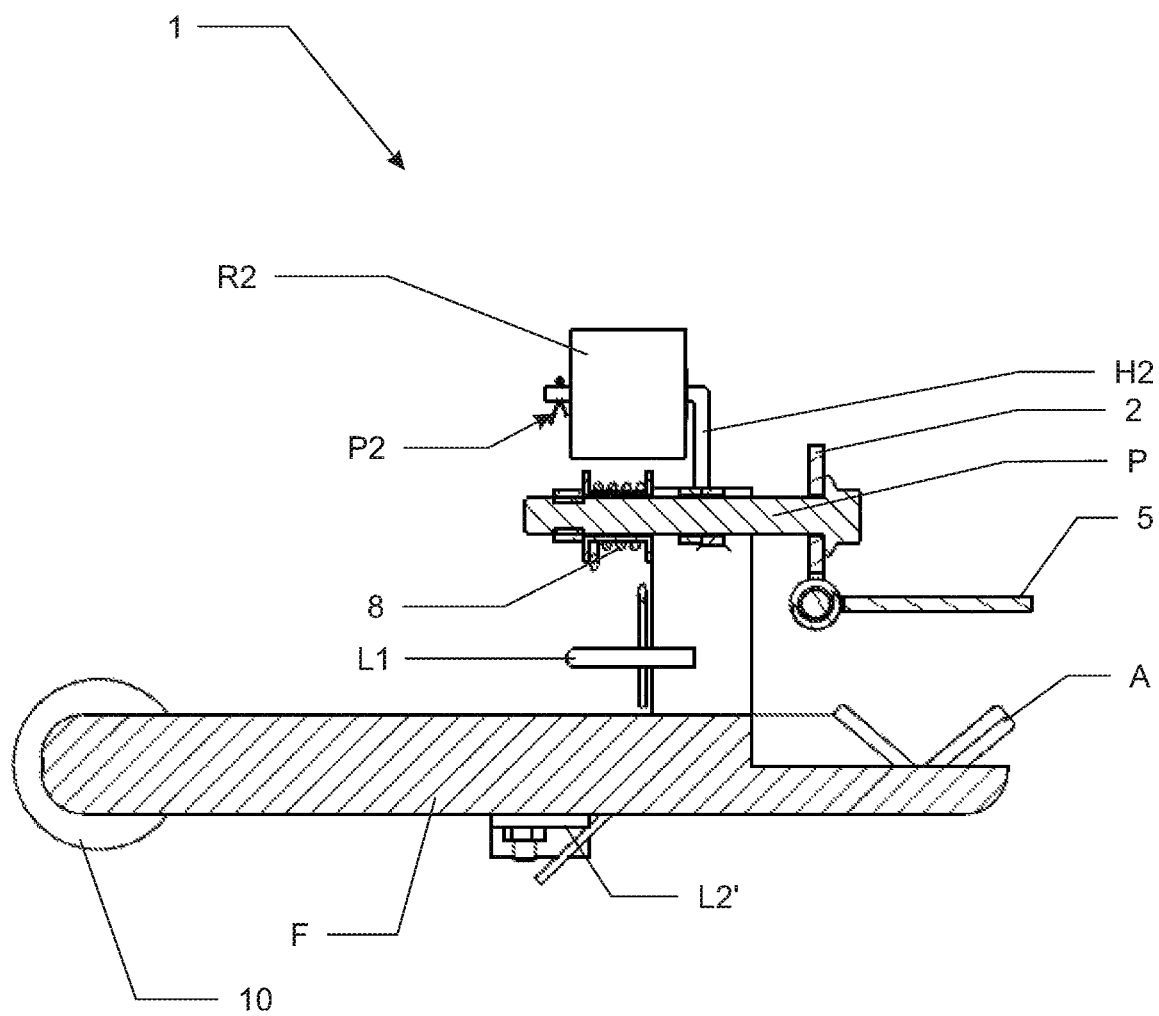
FIG. 18: Sectional side view of the arrangement for a machine for breaking eggs and separating the egg yolk and the egg white, showing an expanded detail of the cutting device composed of a side bearing.

The ARRANGEMENT FOR A MACHINE FOR BREAKING EGGS AND SEPARATING THE EGG YOLK AND THE EGG WHITE, object of this patent application refers to a machine (MA) which includes a structure (E1) and (E2), wherein structure (E1) has a conveyor belt (ES), and the structure (E2) has a rotary carousel (CRR), comprised of a plurality of cutting devices (1), as well as a convex tray (CX), which conducts the egg yolk (G) and the egg white (CL) to a compartment (11) and a tapered compartment (12) provided with an open slit (13); and for the disposal of egg shells (O), the machine (MA) still includes a compartment (14) for housing said egg shells (O); and the separation of the egg yolk (G) from the egg white (CL) of the egg (O) occurs through the compartment (11) that leads the egg yolk (G) and the egg white (CL) to a second tapered compartment (12), which is equipped with an open slit (13) causes the egg white (CL) drains through said slit, while the egg yolk (G) follows the regular flow to another container.

More particularly, the machine (MA) consists of a cutting device (1) comprised of a fixing support (2), which has a shaft (3) welded to its body, wherein said shaft (3) is equipped with a coupling spring (4) and one end which forms a leg with an articulating cover (5); at its opposite end, the shaft (3) receives the arm (6) of the articulating cover (5), thus causing the pivoting of the articulating cover (5); from the fixing support (2) laterally derives a rod (H1) provided with a bearing (R1); the fixing support (2) has a longitudinal screw (P), which has a set of washers (7) interspersed by two rectangular supports (SR) which are equipped with limiters (L1) more precisely located in the central part of each rectangular support (SR); after the set of washers (7) and the rectangular supports (SR), there is a coupling spring (8), in which the limiters (L1) of the rectangular supports (SR) receive the legs of the coupling springs (8), in order to provide a retractable mechanism, that is, opening and closing with automatic return of the rectangular supports (SR); in addition the screw (P) receives a last washer (7') of larger diameter and a nut for the fixation of the set.

The rectangular supports (SR) still comprise two rods (H2) welded to them, wherein said rods (H2) are slightly arched, in order to receive bearings (R2) that are fastened by clips (P2). In the opposite way, the rectangular supports (SR) receive a set of knives (F) which are symmetrical and opposite, also equipped with limiters (L2), which receive the traction of coupling springs (8'), arranged in a shaft (9) equipped with a screw and a washer, for fixing the knives (F) on the rectangular supports (SR), as well as for the coupling springs (8'). Still on the set of knives (F), they comprise edges (A) and their end, which accommodate eggs (O); at its opposite end, the knives (F) comprise bearings (10), which run through the track (PS) of the arched support (SA1) at 180°.

Operation of the cutting device:

The cutting device (1) is fixed on crossbeams (TV1) by screws, in which the cutting devices (1) are connected through a connecting rod (LG), while the rotary carousel (CRR) rotates at an "X" RPM through a transmission mechanism described below, whose kinetic energy comes from a gearmotor (M) and an electric motor (M'). The cutting device (1) starts its breaking cycle; dumping of the egg yolk (G) and egg white (CL); dumping the egg shell (O); separation of the egg yolk (G) from the egg white (CL), as follows: the eggs (O) are accommodated on the conveyor belt (ES) which makes a continuous 360° movement, so that the accommodated eggs (O) are poured into the edges (A) of the cutting device (1); so that the edges (A) receive the eggs (O); the articulating cover (5) is opened when the rod (H1) equipped with a bearing (R1) passes through the convex support (SV1) located above the bearing housing (MRD), then during the rotate of the rotary carousel (CRR), the egg (O) is dumped into the edges (A), and when the bearing (R1) ends its course on the convex support (SV1) the articulating cover (5) returns again to its original position, that is, closed, in which, simultaneously, the knives (F) are activated after their bearings (10) travel the entire length of the track (PS) of the arched supports (SA1), and change their angle of rest to an angle of 90°, making with the knives (F) to be activated from bottom to top, occurring the breaking of the eggs (O) allocated in the edges (A); after this step, the bearings (R2) provided on slightly arched rods (H2) come into contact with the arched supports (SA2) in profile shape (PL), causing the bearings (R2) to be compressed, while the set of knives (F) are opened by pouring the egg yolk (G) with the egg white (CL) into a convex tray (CX); the following stage occurs at the moment when the knives (F) are closed again after the bearings (R2) leave the arched supports (SA2) in the profile shape (PL); also simultaneously the articulating cover (5) is opened again when the bearing (R1) attached to the rod (H1) touches the second convex support (SV2) located at the rear of the structure (E2), causing the egg shell (O) to be dumped into a "U" compartment (14) to any container; meanwhile the egg yolk (G) and egg white (CL) after finishing their course on the convex tray (CX), enter a compartment (11) which is connected to a second tapered compartment (12) equipped with a side open slit (13), thus passing the egg yolk (G) straight into any container, while the egg white (CL) flows through the side open slit (13), going to any other container. The cycle above described is repeated continuously, making the break, the disposal of egg shells (O), as well as the separation of egg yolk (G) from egg white (CL). It is important to highlight that the arched supports (SA1) at a 180° angle are located internally in the rotary carousel (CRR), in which the fixation system of the arched supports (SA1) is made by means of a clamp (M2) on the spindle (EA); the arched supports (SA1) present a track (PS), which are directed to the top of the rotary carousel (CRR); said rotary carousel (CRR) has three other arched supports (SA2) at an angle of 180°, they comprise a profile-shaped body (PL) directed to the bottom of the rotary carousel (CRR); the fixing of the arched supports (SA2) is done by means of a clamp (M2') on the spindle (EA).

Machine structure: The machine (MA) is comprised of two structures (E1) and (E2) wherein one structure (E1) is designated for the conveyor belt (ES), which basically consists of a plurality of rollers (R) attached to chains (CR) by means of screws (P), and pivoted by a system composed of sprockets (CD) in parallel, in which said sprockets (CD) are anchored by bearing housings (MRA), (MRB), (MRC) AND (MRD) which are fixed on two parallel and longitudinal crossbeams (TL), the same ones comprising rectangular slits (FR); such rectangular slits (FR) have the objective of provide regulation to said bearings (MRA) and (MRB), in terms of maintaining the chain tension (CR); there is further a welded worm thread (RS) screwed on supports that are also fixed (S1) in the longitudinal crossbeams (TL); the sprockets (CD) receive chains (CR), in order to perform the rotation of the rollers (R), such rotation comes from the kinetic energy of a transmission mechanism by means of a gearmotor (M) composed of an electric motor (M').

The rotation of the rollers (R) is done by a transmission mechanism as mentioned above, which starts from the fourth bearing housing (MRD), which in addition to having a sprocket (CD) turned inwards the conveyor belt (ES), it has further a sprocket (CDA) facing the outside of the conveyor belt (ES); above the bearing housing (MRD), a plate (15) is located with an oblong slot (16) which interweaves the bearing housing (MRD), while the plate (15) receives a overlaid plate (17) with an oblong slot (18) that aligns with the oblong slot (16) of the plate (15), receiving screws and washers to provide an adjustment for a convex support (SV1) located on the plate (17).

The structure (E1) of the conveyor belt (ES) comprises further two plates (P1) and (P1') with adjustment; the plate (P1) has an oblong slot (R01) in order to provide the adjustment in height; the plate (P1') has adjustment for a sprocket (CDB) with a diagonal oblong slot (R02). The sprocket (CDB) is aligned with another sprocket (CDC), now of larger diameter, and the sprocket (CDC) of larger diameter is located in a spindle (EA) of the rotary carousel (CRR) located in the structure (E2); said sprockets (CDA), (CDB) and (CDC) receive a chain (CR), and this chain (CR) is driven by the external sprocket (CDA) of the fourth bearing housing (MRD) located in the structure (E1). A tension sprocket (CT) is located between the sprockets (CDA), (CDB) to maintain the chain (CR) without slackness during the process operation.

The spindle (EA) of the rotary carousel (CRR), rear to the sprocket (CDC) comprises further another sprocket (CDE) aligned with the last sprocket (CDF) which has its rotation from the kinetic energy of a gearmotor (M) and electric motor (M'); the gearmotor (M) and the electric motor (M') are allocated in a second structure (E2), which is welded to the first structure (E1) of the conveyor belt (ES). The second structure (E2) comprises a rotary carousel (CRR), which is composed of a spindle (EA) anchored by clamps (M1) at the lateral ends of the structure (E2).

The rotary carousel (CRR) is composed of arched supports (SA1) at an angle of 180° located internally in the rotary carousel (CRR); the fixation system of the arched supports (SA1) is made through a clamp (M2) on the spindle (EA); the arched supports (SA1) have a track (PS) and they are directed to the top of the rotary carousel (CRR); said rotary carousel (CRR) includes three other arched supports (SA2) with also an angle of 180°, however, they comprise a profile-shaped body (PL) directed towards the bottom of the rotary carousel (CRR), whose fixing of the arched supports (SA2) is made by means of a clamp (M2') on the spindle (EA).

The rotary carousel (CRR) further comprises protection supports (SP) containing geometric holes (VG) and cross-beams (TV1) with the function of receiving the cutting devices (1) through fixation by screws. The structure (E2) includes further a support (19) which is laterally overlaid by a second convex support (SV2) through a plate (20); the plate (20) has an oblong slot (R05), to provide the adjustment of said convex support (SV2). At the other end of the rotary carousel (CRR), more precisely above the fourth bearing housing (MRD), a second convex support (SV2) is provided.

The invention claimed is:

1. An arrangement for a machine for breaking eggs, and separating egg yolk and egg white in an egg breaking cycle as well as disposal of egg shells, the machine comprising:
   a cutting device with a fixing support which has a shaft equipped with at least one coupling spring and an articulating cover equipped with an arm; the fixing support includes a side rod equipped with a bearing;
   at the rear, the fixing support has a longitudinal screw that includes a set of washers interspersed by two rectangular supports equipped with limiters; the at least one coupling spring is located behind the set of washers and the two rectangular supports, wherein the limiters of the two rectangular supports receive the legs of the at least one coupling spring, the longitudinal screw receives a last washer of a larger diameter and a nut; the two rectangular supports further comprise two rods welded to them, wherein said two rods are arched and are capable of receiving bearings fastened by clips;

a rotary carousel having at least two cutting devices, each cutting device including a set of symmetrical and opposite knives equipped with limiters that are configured for drawing each of the at least one coupling spring, arranged on a shaft with a screw and a washer, the limiters able to fix the knives and the at least one coupling spring in the two rectangular supports;

each set of knives comprises edges at its end and is configured to accommodate the eggs;

an opposite end of each set of knives comprises bearings able to travel a track of arched supports to actuate the knives;

each cutting device is located in the rotary carousel and the rotary carousel is sufficiently capable of spinning through kinetic energy from a gearmotor composed of an electric motor, wherein each cutting device is configured to perform a breaking cycle of dumping of the egg yolk and the egg white, dumping of the egg shells, and separation of the egg yolk and the egg white;

the eggs are able to be accommodated on a conveyor belt system configured to make a continuous movement and including chains so that the eggs can be poured into edges of each cutting device, a convex support is located above a bearing housing;

bearings are provided on rods; there are arched supports in a profile shape capable of causing the bearings to be compressed;

the set of knives is also capable of being opened by pouring the egg yolk with the egg white into a convex tray; further comprising a second convex support located at the rear of a structure;

a compartment is connected to a second tapered compartment provided with a side open slit to carry out the passage of the egg yolk directly to any container, while the egg white runs down the side open slit, going to any other container;

the conveyor belt system comprises a plurality of rollers able to be attached to said chains through screws and is pivoted by a system of sprockets in parallel;

the system includes at least four bearing housings, wherein said sprockets are each anchored by a respective bearing housing fixed on two longitudinal crossbeams that comprise rectangular slits, the sprockets are configured to receive the chains, in order to rotate the rollers, wherein such rotation is provided from the kinetic energy of a transmission mechanism by a gearmotor including an electric motor;

a plate provided with an oblong slot is located adjacent to one end of the conveyor belt system, wherein the plate receives an overlaid plate with an oblong slot that aligns with the oblong slot of the plate, each slot receiving respective screws and washers, the adjustment of the plate configured to provide an adjustment for a convex support, a spindle of the rotary carousel is located in the structure;

said sprockets receive said chains that are able to be driven by an external sprocket of the fourth bearing housing located in the structure;

a tension sprocket able to maintain the chains without slackness during the operation of the process;

the spindle of the carousel includes one more sprockets adapted to be aligned to a last sprocket which has its rotation coming from the kinetic energy of the gearmotor and the electric motor; the gearmotor and the electric motor are located in a second structure, which is welded to the first structure of the conveyor belt;

the rotary carousel is comprised of arched supports which are adapted to fit in the spindle through a clamp that still has a track;

said rotary carousel includes three other arched supports, the three other arched supports comprise a profile-shaped body directed to the bottom of the rotary carousel; the three other arched supports are fixed to the spindle of the rotary carousel;

the rotary carousel includes protection supports containing geometric holes and crossbeams.

* * * * *